United States Patent
Guenther

[11] Patent Number: 6,163,748
[45] Date of Patent: Dec. 19, 2000

[54] METHOD FOR CONTROLLING TRANSPORT AND TRAVEL OPERATIONS

[75] Inventor: Christian Guenther, Munich, Germany

[73] Assignee: DaimlerChrysler AG, Stuttgart, Germany

[21] Appl. No.: 09/264,708

[22] Filed: Mar. 9, 1999

Related U.S. Application Data

[63] Continuation of application No. PCT/EP97/04456, Aug. 14, 1997.

[30] Foreign Application Priority Data

Sep. 9, 1996 [DE] Germany ............................ 196 36 379

[51] Int. Cl.$^7$ ..................................................... G06F 19/00
[52] U.S. Cl. ........................... 701/202; 701/209; 701/210
[58] Field of Search .................................... 701/200, 202, 701/207, 208, 209, 210, 211, 213; 73/178 R; 340/988, 990, 995

[56] References Cited

U.S. PATENT DOCUMENTS

| | | | |
|---|---|---|---|
| 4,954,958 | 9/1990 | Savage et al. | 701/202 |
| 5,177,685 | 1/1993 | Davis et al. | 701/209 |
| 5,184,303 | 2/1993 | Link | 701/210 |
| 5,544,061 | 8/1996 | Morimoto et al. | 701/202 |
| 5,784,059 | 7/1998 | Morimoto et al. | 701/209 |
| 5,802,492 | 9/1998 | Delorme et al. | 701/208 |
| 5,845,227 | 12/1998 | Peterson | 701/209 |
| 5,862,509 | 1/1999 | Desai et al. | 701/202 |
| 5,910,782 | 6/1999 | Schmitt et al. | 701/202 |
| 5,924,075 | 7/1999 | Kanemitsu | 701/202 |

FOREIGN PATENT DOCUMENTS

| | | |
|---|---|---|
| 0 333 330 A1 | 9/1989 | European Pat. Off. . |
| 42 20 963 A1 | 1/1993 | Germany . |
| WO 90/02391 | 3/1990 | WIPO . |
| WO 92/14215 | 8/1992 | WIPO . |
| WO 95/21435 | 8/1995 | WIPO . |

*Primary Examiner*—Gary Chin
*Attorney, Agent, or Firm*—Evenson, McKeown, Edwards & Lenahan, P.L.L.C.

[57] ABSTRACT

In a method for controlling transport and travel operations, the route between the starting point and the destination point is optimized to accommodate preselectable requirements and made available by means of a computer on the basis of stored general information by way of the junction points of a traffic network. Individual information concerning the accessibility of precise destination points is collected, stored and updated from the junction points of a general route network. This individual information is used, with other information, for computer-implemented optimization of the route and of the transport means.

17 Claims, 2 Drawing Sheets

METHOD FOR CONTROLLING TRANSPORT AND TRAVEL OPERATIONS

CROSS-REFERENCE TO RELATED APPLICATIONS

This application is a continuation of PCT Application No. PCT/EP97/04456 filed on Aug. 14, 1997.

BACKGROUND AND SUMMARY OF THE INVENTION

This application claims the priority of 196 36 379.9, filed Sep. 9, 1996, the disclosure of which is expressly incorporated by reference herein.

The invention relates to a method and apparatus for controlling transport and travel operations, in which the route between the starting point and the destination point, which is optimized under preselectable aspects, is determined and made available by means of a computer on the basis of stored general information, by way of the junction points of a traffic network.

Various methods of this type are known. They are essentially based on data collections (as a rule, on CD-ROM), which contain the data of a traffic network, such as a road, railroad or flight network, and use a computer which determines the most favorable route between two or optionally several points of the respective network. In this case, parameters, such as price, speed, route distance or the like, are taken into account. The user enters the starting point (locality, street) and the destination, and receives a corresponding route plan.

In practice, it has been found, however, that many more parameters must be taken into account in order to generate an optimal route suggestion. Thus, it is of interest, for example, whether or not the traveler has luggage to be transported. In addition, the junction points of normal traffic networks are relatively loosely distributed so that, although the smallest element that can be used within a city may be a street, for example; within a country, the smallest element that can be used may only be a "city district" or the like. In addition, the conventional route planners contain no information concerning construction sites present for a limited time which may prevent access to the destination on the suggested route. Finally, they contain no information beyond the traffic network, as, for example, that, although the destination is on a bus stop and on a principal street, the bus operates only in rush-hour traffic and at this time the road is completely clogged. Furthermore, they are incapable of indicating a destination upon the visitor's request which, for example, has the characteristic of being a currently open beer garden which he can reach by public transportation before 8 p.m. and from which he can still use public transportation after 11 p.m. for the trip home.

It is an object of the invention to provide a method which permits the use of all relevant information for the connection possibilities between an exact starting point and an exact destination point to establish an optimal route plan.

It is another object of the invention to carry out a proportion of the overall mobility which is as large as possible in an efficient and environmentally compatible manner such that all available public and private traffic means and systems are optimally utilized and used according to their strengths. In addition to the automobile, this includes all rail-bound short-distance and long-distance means of transport and air traffic. Part of the new approach is a communication concept which is to be utilized intuitively and which ensures an easy access to the system by the users.

Other objects, advantages and novel features of the present invention will become apparent from the following detailed description of the invention when considered in conjunction with the accompanying drawings.

DETAILED DESCRIPTION OF THE DRAWINGS

The method according to the invention defines and assigns an individual traffic code to private persons, firms, institutions and agencies, and utilizes the assigned codes to offer individual route plans to the requesting user. A selected plan is then implemented utilizing all traffic operators available in the special case.

The traffic code provides an additional identification (for example, a three-digit sequence of numbers), and supplements the telephone number, fax number and E-mail address by a traffic-specific information. It can be made accessible either by traditional media or on-line to the interested party.

Figure 1:
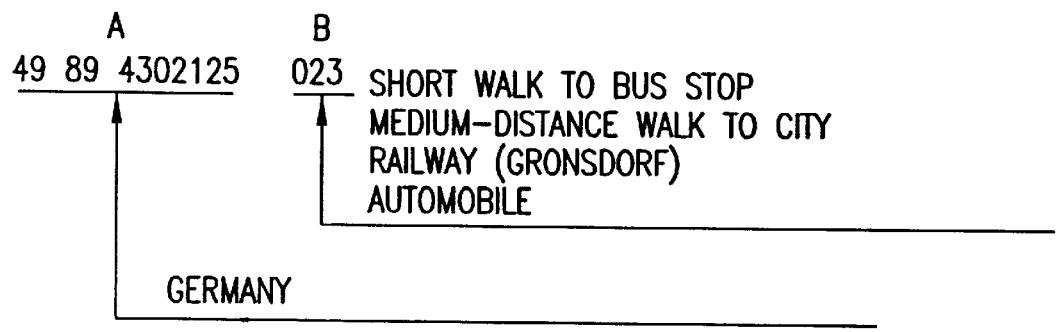
FIG. 1 is a schematic view of a first coding possibility for the data.

The traffic code can be defined in different manners:

According to FIG. 1, for example, the traffic code consists simply of the telephone number and linkage data. That is, Group A in FIG. 1 contains the telephone number, including the country code and the pertaining address "Germany, Muenchen, Sperberstrasse 6"; Group B, in contrast, contains in a coded from the data concerning the linkage to the traffic system, for 0 short walk to bus stop 2 medium-distance walk to city railway (Gronsdorf)

3 access by car possible as well as additional codes for parking possibilities, limitations concerning approach roads, business hours, and the like.

Figure 2:
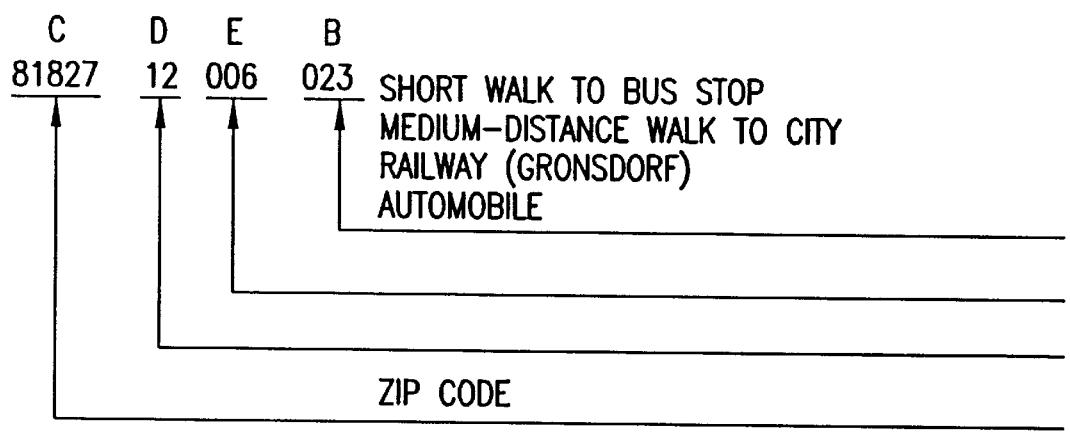
FIG. 2 is a schematic view of a second coding possibility for the data while using an already existing identification.

In the embodiment according to FIG. 2, the traffic code consists of a sequence of numbers with four Groups C, D, E and B. These mean:

C zip code

D number code for the street "Sperberstraße"

E house number "6"

B number code of the usable traffic links of the entered party, as in the example according to FIG. 1.

However, the traffic code may also consist of the fax or E-mail address plus linkage data or any other combination of locality and linkage data.

An important aspect of the method according to the invention is the assignment of traffic linking information to a locality code which, advantageously—as described above—is an already existing identification, such as a telephone number.

The utilization of the traffic code takes place exclusively by means of the planned purpose of the trip. It is therefore no longer necessary that the inquiring person knows where his destination is. Rather, needs only express the wish that he wants to carry out an errand, go shopping, discuss something or see something. The computer will inform him how to reach the destination to achieve the expressed desire.

The user determines the traffic code of his destination by way of media, such as the classified telephone business listings or advertisements, and transmits the code, for example, by telephone to the central networking computer. Another important usage area of the traffic code is the linking of new on-line services, which are offered over the Internet, and traffic services, such as route finding, or booking of means of public transportation, with product offers and service offers such that the end user only has to indicate which offer he wants to use. The on-line service will then indicate the route most convenient to him leading to the offerer while using the traffic code assigned to the offer.

The computer automatically recognizes the traffic code of the inquiring user and now determines from the two available traffic codes the routing task, solves this routing task by using the up-to-date information available to the computer concerning means of public transportation and the current traffic situation, books the required parking spaces, train, bus, taxi connections, etc. and reports the result to the inquiring user via fax, on-line service or other media. This report may also represent an authorization to use means of public transportation, in which case costs are debited to the account via direct debit authorization. Thus, the user receives not only a route plan, but also complete travel papers.

The route plan can also be transferred to a navigation system so that the user does not have to follow the plan and is guided to the determined destination by the destination guiding system of his car.

Figure 3:
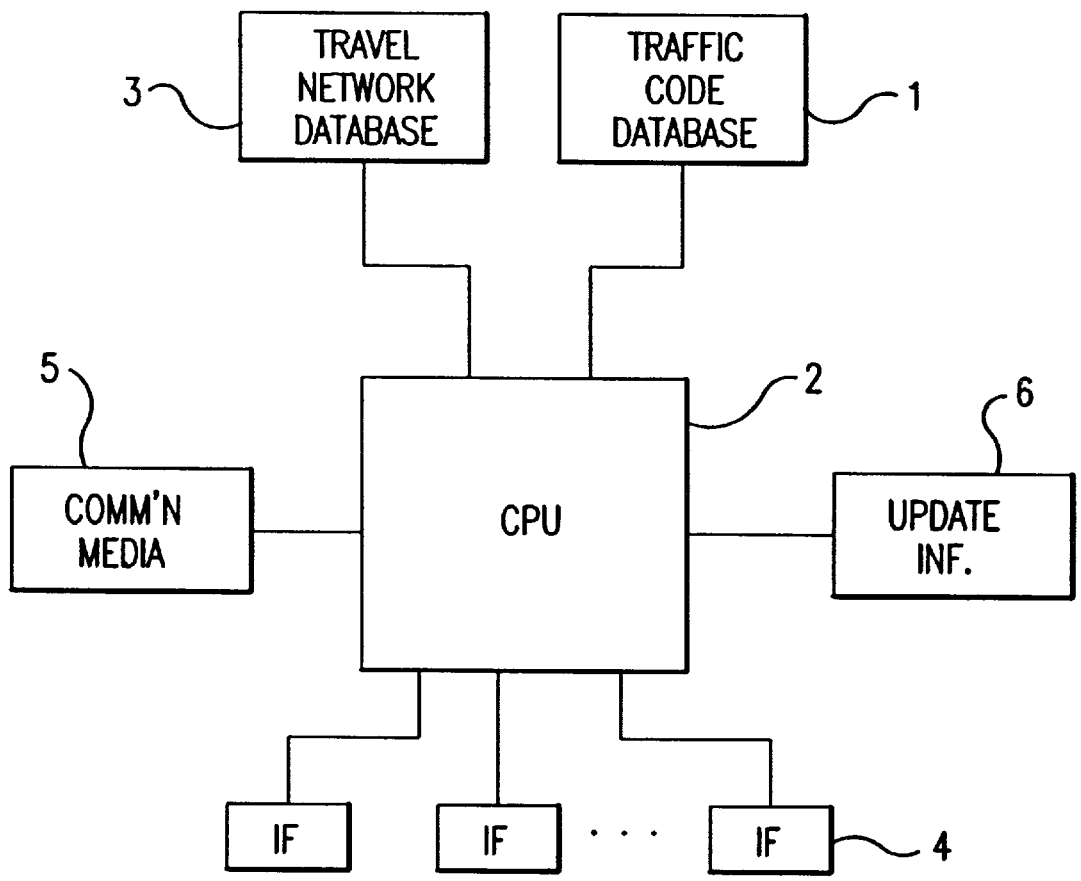
FIG. 3 is a conceptual block diagram of a travel control system according to the invention.

FIG. 3 is a schematic diagram which shows the structure of a travel control system according to the invention. A traffic code database, such as is described above stored in a traffic code data base memory unit 1, which is accessible by a central processor unit or computer 2. Travel network database information, including, for example, a road network information, airline and train routes, digital information, cost information, and other travel relevant information, may be stored in a second memory 3, also accessible to the CPU 2. A plurality of remotely located user interfaces 4 provides for the entry of travel requests by a person or entity who wishes to use the system. In response to the travel request, the CPU 2 reads information from the traffic code database 1 and the travel network database 3, and processes it to generate travel information, including, where appropriate, necessary travel reservations and travel documents, which information is communicated to the requestor via the interface unit 4. The CPU may also be connected to mass communications media 5, including, for example, the internet, or a telephone communications network. Provision is made for the entry of updated information 6 into the CPU, in order to maintain the traffic code database and the travel network database current.

In a further development of the invention, in the case of movable destinations or targets, such as a cellular phone, as required, the destination or target to be reached can be updated such that the location of the destination or target is determined and the route plane is established or corrected correspondingly. The determination of the location can take place, for example, by means of a call in the case of a cellular phone which, in turn, will automatically transmit the current coordinates determined by means of a GPS unit, if its user approves it.

The updating of the linkage part B of the traffic code expediently takes place by the assigned subscriber himself, since he not only has the best information concerning the local conditions and their changes but is also most interested in being reached without any problems.

The method according to the invention is also suitable for solving additional tasks.

For a partial mobility range, the travel purpose directly defines the requirements for carrying out trips and transports, so that the precise destination of a trip does not have to be indicated. Rather, the trip or the transport is understood only as a derived result of a wish to execute something or carry something out. The purpose of the trip is the center of attention and not the trip itself.

The system according to the invention therefore asks the user only to indicate the precise purpose of his trip ("I want to go shopping at . . . "; "I want to drive to my workplace on a regular basis;" "I want to spend my vacation in . . . "; "I have to have my passport extended"; "I have a meeting with firm . . . in . . . on Thursday at 16:00"; etc.) Precise knowledge of the location or position of the destination of the trip is not required for the booking.

The core of the concept of the method according to the invention is the assignment of "traffic codes" to offerers, firms, businesses, etc., on the one hand, and to the user, on the other hand. This is to be understood as an expansion of the classified business telephone listings, which currently contain telephone and fax numbers and sometimes E-mail, to include a new type of electronic information, and which the listings, in addition to the communication data, will now contain the traffic code corresponding to the method of the invention. The listings in the telephone books will then also expediently contain the traffic code, in addition to the telephone numbers.

By means of the method according to the invention, the object is achieved of determining, with the use of data banks and the current and predicted traffic situation, the best connection between two traffic codes (the code of the inputter and the entered code) organizing the trip, booking it and causing the implementation.

The ability to link communication data and traffic codes opens up completely new possibilities of information processing, so that the communication interface of the new system can be utilized not only for organizing and implementing the trip but also beforehand for carrying out selection, comparison and evaluation processes (Example: "Where do I find a 16×9 television for under DM 2,000 ?").

The method according to the invention uses a transport integrator which—aided by correspondingly powerful and dynamic databanks—is capable of computing automatically the location, from the entered purpose and the location of the input of the desire to carry something out; of finding and the most favorable connection by utilizing all available short-distance and long-distance means of transport; of carrying out the booking; of providing the traveler with the corresponding documents; and of organizing the trip.

The overall system is conceived such that it can be introduced and expanded in steps. Furthermore, the system also supplies precise information concerning the best routes, frequencies and stops of the participating traffic systems and uses the private automobile as required.

The communication with the traveller takes place by way of a communication interface which can be operated in a simple and intuitive manner and which makes no excessive demands on the user's concentration and intelligence. A television with a set top box is suitable for this purpose which also contains a data output medium and an input, selection or acknowledgement unit which is easy to operate. Furthermore, the method is particularly suitable for Internet on-line services and the internet-compatible terminals, such a PCs, laptops, personal digital assistants and other communication units which can be carried along on the person or in the vehicle.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. Method for controlling transport and travel operations, in which a route between a selected starting point and a destination point is optimized to accommodate preselectable requirements, and is made available through a computer, comprising:

storing general information defining transportation media, including junction points of said media, within a geographic area;

collecting, storing and updating a database of individual information entries for destination points within the geographic area, each such individual information entry comprising a destination point designator for a particular destination point within the geographic area, together with accessibility data defining accessibility between said particular destination point and said transportation media; and using said individual information entries in a computer-implemented optimization of a route and a transport means to the destination point.

2. Method according to claim 1, wherein the destination point designated in each individual information entry comprises a preexisting publicly available individual identification of the destination.

3. Method according to claim 2, where one of a telephone number and a fax number is used as the individual identification.

4. Method according to claim 2, wherein an E-mail address is used as the individual identification.

5. Method according to claim 2, wherein a zip code is used as the individual identification.

6. Method according to claim 1, wherein:

route planning is performed via an on-line service; and a route between a precise starting point and a precise destination point is determined by the computer and is transmitted to the inquirer so that it can be electronically utilized or as a hard copy or by telefax.

7. Method according to claim 1, wherein said step of using said individual information entries comprises:

a user specifying a desired performance objective; and said computer selecting and suggesting a destination point corresponding to the desired performance objective specified by the user.

8. Method according to claim 1, wherein a current or predicted traffic situation is used to determine an optimal route.

9. Method according to claim 1, wherein a route planning is transferred directly to a navigation system at the inquiring party.

10. Method according to claim 7, wherein the selected destination point is transferred directly to a navigation system of the inquiring party.

11. Method according to claim 1, wherein a momentary location of a mobile destination or target point is determined and updated by localization or calls in the telephone radio network.

12. Method according to claim 8, wherein for the precise determination of location by way of a telephone radio network, geographic coordinates of the destination point are determined by way of a GPS navigation system and are transmitted by way of a cellular telephone.

13. A system for controlling transport and travel operations comprising:

a data processing unit;

a first computer readable memory storage medium encoded with a data structure comprising individual traffic codes assigned to respective institutions and entities within a geographic area, each of said traffic codes including i) an identity code which identifies a particular institution or entity by associating with it a preexisting publicly available designation, and ii) a linkage code, conjoined with said identity code, said linkage code characterizing accessibility between said particular institution or entity and transportation media within said geographic area;

means for remotely accessing said data processing unit, and for inputting a traffic code of an accessing entity together with a travel request including a traffic code of an institution or entity within said geographic area; and means for communicating travel information from said data processing unit to said accessing entity.

14. A system for controlling transport and travel operations comprising:

a data processing unit;

a first computer readable memory storage medium encoded with a data structure comprising individual traffic codes assigned respectively to institutions and entities within a geographic area, each of said traffic codes including i) an identity code which identifies a particular institution or entity by associating with it a preexisting publicly available designation and ii) a linkage code, conjoined with said identity code, said linkage code characterizing accessibility between said particular institution or entity and transportation media within said geographic area;

means for remotely accessing said data processing unit, and for inputting a traffic code of an accessing entity together with a travel request including a traffic code of an institution or entity within said geographic area;

means for communicating travel information from said data processing unit to said accessing entity; and a second computer readable memory storage medium encoded with a transportation database comprising information concerning transportation media within said geographic area, including at least route, timing, and connection information;

wherein said data processing unit utilizes information from said transportation database and traffic code information from said first computer readable memory storage medium to generate said travel information.

15. A method for controlling transport and travel operations comprising:

assigning to institutions and entities within a geographic area respective individual traffic codes, each of which includes an identity code that identifies a particular institution or entity by associating with it a publicly available designation, said identity code being conjoined with a linkage code which characterizes accessibility between said particular institution or entity and transportation media within said geographic area;

providing a remotely accessible transportation access database comprising said traffic codes;

a requesting entity entering a travel request into a central data processing system, said travel request comprising a traffic code assigned to the requesting entity and a traffic code of a particular institution or entity within the geographic area;

said central data processing system reading information from said transportation access database in response to said travel request, and processing said information with said travel request to generate travel information responsive to said travel request; and said central data processing system communicating said travel information to said requesting entity.

16. The method according to claim 15 wherein said central data processing system also automatically makes travel reservations on transportation media in said geographic area in response to said travel request and provides travel documents to said requesting entity.

17. The method according to claim 15 further comprising providing a transportation database comprising information concerning transportation media within said geographic area, including at least route, timing and connection information; and processing information from said transportation database and traffic code information from said transportation access database to generate said travel information.

\* \* \* \* \*